US010393538B2

(12) United States Patent
Oostveen

(10) Patent No.: US 10,393,538 B2
(45) Date of Patent: *Aug. 27, 2019

(54) NAVIGATION APPARATUS AND METHOD OF PROVIDING WEATHER CONDITION INFORMATION

(71) Applicant: TomTom Navigation B.V., Amsterdam (NL)

(72) Inventor: Daan Dirk Oostveen, Haarlem (NL)

(73) Assignee: TOMTOM NAVIGATION B.V., Amsterdam (NL)

(*) Notice: Subject to any disclaimer, the term of this patent is extended or adjusted under 35 U.S.C. 154(b) by 0 days.

This patent is subject to a terminal disclaimer.

(21) Appl. No.: 15/212,368

(22) Filed: Jul. 18, 2016

(65) Prior Publication Data

US 2016/0327406 A1    Nov. 10, 2016

Related U.S. Application Data

(63) Continuation of application No. 13/977,795, filed as application No. PCT/EP2010/070968 on Dec. 31, 2010, now Pat. No. 9,395,201.

(51) Int. Cl.
*G01C 21/36* (2006.01)
*G01C 21/34* (2006.01)
*G01W 1/04* (2006.01)

(52) U.S. Cl.
CPC ..... *G01C 21/3667* (2013.01); *G01C 21/3453* (2013.01); *G01C 21/3676* (2013.01); *G01C 21/3694* (2013.01); *G01W 1/04* (2013.01)

(58) Field of Classification Search
CPC ............ G01C 21/3453; G01C 21/3667; G01C 21/3676; G01C 21/3691; G01C 21/3694; G01W 1/04; G08G 1/0969
See application file for complete search history.

(56) References Cited

U.S. PATENT DOCUMENTS 5,911,775 A * 6/1999 Tanimoto ......... G08G 1/096827
340/988
2004/0202154 A1* 10/2004 Aklepi ................... G06Q 10/08
370/352

(Continued)

FOREIGN PATENT DOCUMENTS

JP          2000258174 A  *  9/2000  ......... G01C 21/3694

*Primary Examiner* — Thomas G Black
*Assistant Examiner* — Ce Li Li

(57) ABSTRACT

A navigation apparatus comprises a processing resource arranged to support, when in use, an operational environment, the operational environment supporting a route calculator, a time estimation module, a route segmentation module and a weather data processing engine. A map database comprising geospatial data is also provided. The route calculator is arranged to calculate, when in use, a route between a first location and a second location. The time estimation module is arranged to estimate a time at which a user will be present at a location along the route. The route segmentation module arranged to divide the route into a plurality of route parts and to obtain from the time estimation module at least one time of presence associated with at least one of the plurality of route parts, respectively. The weather data processing engine arranged to provide weather data associated with a route part of the plurality of route parts in respect of the time of presence associated with the route part.

23 Claims, 10 Drawing Sheets

(56) References Cited

U.S. PATENT DOCUMENTS

| | | | | |
|---|---|---|---|---|
| 2004/0254723 | A1* | 12/2004 | Tu | G01C 21/3679 |
| | | | | 701/410 |
| 2004/0260465 | A1* | 12/2004 | Tu | G01C 21/3679 |
| | | | | 701/426 |
| 2008/0180282 | A1* | 7/2008 | Brosius | G01C 21/00 |
| | | | | 340/995.27 |
| 2009/0037100 | A1* | 2/2009 | Fujiwara | G01C 21/3492 |
| | | | | 701/533 |
| 2009/0150156 | A1* | 6/2009 | Kennewick | G06Q 30/0261 |
| | | | | 704/257 |
| 2009/0248289 | A1* | 10/2009 | Tanaka | G01C 21/3461 |
| | | | | 701/532 |
| 2010/0123737 | A1* | 5/2010 | Williamson | G01C 21/3647 |
| | | | | 345/672 |
| 2011/0137551 | A1* | 6/2011 | Peri | G01C 21/3453 |
| | | | | 701/533 |
| 2011/0166777 | A1* | 7/2011 | Chavakula | G01C 21/3667 |
| | | | | 701/533 |
| 2011/0208417 | A1* | 8/2011 | Fink | G01C 21/3676 |
| | | | | 701/532 |
| 2011/0320118 | A1* | 12/2011 | Ho | G01C 21/3407 |
| | | | | 701/465 |
| 2012/0101809 | A1* | 4/2012 | Kennewick | G06Q 30/0261 |
| | | | | 704/9 |
| 2012/0109753 | A1* | 5/2012 | Kennewick | G06Q 30/0261 |
| | | | | 705/14.58 |

\* cited by examiner

NAVIGATION APPARATUS AND METHOD OF PROVIDING WEATHER CONDITION INFORMATION

CROSS-REFERENCES TO RELATED APPLICATIONS

The present application is a continuation/National Stage of U.S. patent application Ser. No. 13/977,795, filed on Sep. 13, 2013, which is the National Stage of International Application No. PCT/EP2010/070968, filed Dec. 31, 2010 and designating the United States. The entire content of these applications are incorporated herein by reference.

FIELD OF THE INVENTION

The present invention relates to a navigation apparatus of the type that, for example, provides weather information to a user that intends to follow a calculated route. The present invention also relates to a method of providing weather condition information, the method being of the type that, for example, accesses weather data for provision to a user that intends to follow a calculated route.

BACKGROUND TO THE INVENTION

Portable computing devices, for example Portable Navigation Devices (PNDs) that include GPS (Global Positioning System) signal reception and processing functionality are well known and are widely employed as in-car or other vehicle navigation systems.

In general terms, a modern PND comprises a processor, memory and map data stored within said memory. The processor and memory cooperate to provide an execution environment in which a software operating system is typically established, and additionally it is commonplace for one or more additional software programs to be provided to enable the functionality of the PND to be controlled, and to provide various other functions.

Typically, these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but can be on a steering wheel if the device is built into a vehicle), and a microphone for detecting user speech. In one particular arrangement, the output interface display may be configured as a touch sensitive display (by means of a touch sensitive overlay or otherwise) additionally to provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Bluetooth, Wi-Fi, Wi-Max, GSM, UMTS and the like.

PNDs of this type also include a GPS antenna by means of which satellite-broadcast signals, including location data, can be received and subsequently processed to determine a current location of the device.

The PND may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically, such features are most commonly provided in in-vehicle navigation systems, but may also be provided in PNDs if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

The device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking), are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant), a media player, a mobile telephone or the like, and in these cases, the normal functionality of the hand-held system is extended by means of the installation of software on the device to perform both route calculation and navigation along a calculated route.

Once a route has been calculated by a PND, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

As mentioned above, it is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs), which are examples of geographic features, tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated, a simple instruction such as "turn left in 100 m" requires significant processing and analysis. As previously mentioned, user interaction with the device may be by a touch screen, or additionally or alternately by steering column mounted remote control, by voice activation or by any other suitable method.

Devices of the type described above, for example the GO 940 LIVE model manufactured and supplied by TomTom International B.V., provide a reliable means for enabling users to navigate from one position to another. Such devices are of great utility when the user is not familiar with the route to the destination to which they are navigating.

However, in this respect of a journey upon which the user is to embark, it is sometimes useful for a user to be aware of weather conditions before commencement of the journey according to the calculated route.

In order to provide such information it is known to employ a manual solution whereby a user manually researches a time of arrival and then separately checks the weather conditions at a destination at the time of arrival. Another known technique comprises showing a map of a route and providing either a snapshot of a weather condition, i.e. at a single moment in time, displayed on top of the route and/or the map, or displaying an animation showing progression of the global weather conditions over time.

However, such techniques are inherently imprecise, because they are based upon weather conditions at a single location, for example a destination location.

SUMMARY OF THE INVENTION

According to a first aspect of the present invention, there is provided a navigation apparatus comprising: a processing resource arranged to support, when in use, an operational environment, the operational environment supporting a route calculator, a time estimation module, a route segmentation module and a weather data processing engine; a map database comprising geospatial data; the route calculator arranged to calculate, when in use, a route between a first location and a second location; the time estimation module arranged to estimate a time at which a user will be present at a location along the route; and the route segmentation module arranged to divide the route into a plurality of route parts and to obtain from the time estimation module at least one time of presence associated with at least one of the plurality of route parts; and the weather data processing engine arranged to provide weather data associated with a route part of the plurality of route parts in respect of the time of presence associated with the route part.

The apparatus may further comprise a user interface module arranged to communicate to the user the weather data in respect of a number of the plurality of route parts and at respective times of presence associated with the number of the plurality of route parts.

The weather data may be communicated to the user as a list.

The weather data may be communicated graphically in combination with a map.

The weather data may be presented in sections. Each section of weather data may be presented in a substantially aligned manner with an associated route part.

The weather data may be presented in a side bar. The side bar may show progress of the user along the route. The side bar may show a weather condition in respect of an associated stage of the route.

The user interface may be arranged to receive an instruction to re-calculate the route after communicating the weather data.

The instruction to recalculate the route may be an instruction to change the journey start time.

The user interface may be arranged to receive an instruction to re-calculate the route so as to avoid a weather condition is a user-specified route part of the plurality of route parts.

The route calculator may be arranged to re-calculate the route in response to receipt by the user interface of the instruction to re-calculate the route when communicating the weather data.

The weather data processing engine may be arranged to obtain the weather data from a source of weather data remote from the navigation apparatus.

The route calculator may be arranged to receive weather preference data provided by the user and to cooperate with the weather data processing engine in order to calculate the route so as to attempt to satisfy a weather preference represented by the weather preference data.

The route calculated may be performed with respect to a journey start time. The journey start time may be a current time when the journey start time is unspecified.

The route segmentation module may be arranged to divide the route into the plurality of route parts in which to the division of the route is based on a length of the route calculated and/or an estimated travel time for each route part. The plurality of route parts may be of equal length. Alternatively, the plurality of route parts may be of the same temporal length. The temporal length may be an estimated transit time.

A predefined time threshold may be provided and the plurality of route parts may comprise a first route part having a time period associated therewith. The weather data processor may be arranged to recalculate the weather data in respect of the first route part at which the user is to arrive when the user is estimated to arrive at the first route part after the time period and/or the predetermine time threshold after the time period.

According to a second aspect of the present invention, there is provided a method of providing weather condition information, the method comprising: calculating a route between a first location and a second location; estimating a time at which a user will be present at a location along the route; and dividing the route into a plurality of route parts; obtaining from the time estimation module at least one time of presence associated with at least one of the plurality of route parts, respectively; and providing weather data associated with a route part of the plurality of route parts in respect of the time of presence associated with the route part.

The method may further comprise: communicating to the user the weather data in respect of a number of the plurality of route parts and at respective times of presence associated with the number of the plurality of route parts.

The weather data may be communicated to the user as a list.

The weather data may be communicated graphically in combination with a map.

The method may further comprise: receiving an instruction to re-calculate the route when communicating the weather data.

The method may further comprise: receiving an instruction to re-calculate the route so as to avoid a weather condition is a user-specified route part of the plurality of route parts.

The method may further comprise: re-calculating the route in response to receipt by the user interface of the instruction to re-calculate the route after communicating the weather data.

The method may further comprise: obtaining the weather data from a source of weather data remote from the navigation apparatus.

The method may further comprise: receiving weather preference data provided by the user; and calculating the route so as to attempt to satisfy a weather preference represented by the weather preference data.

According to a third aspect of the present invention, there is provided a computer program element comprising computer program code means to make a computer execute the method as set forth above in relation to the second aspect of the invention.

The computer program element may be embodied on a computer readable medium.

It should be appreciated that although the features set forth above or in the appended claims are recited in a certain order, it should be appreciated that the features set forth above or in the appended claims can be used in any suitable combination or individually as appropriate.

It is thus possible to provide a navigation apparatus and a method of providing weather condition information that enables weather information to be presented to the user with enhanced precision. The user is thereby able to be aware of weather conditions at different locations along a calculated route. The user can therefore choose to delay a journey, depart earlier, abandon the journey or avoid one or more parts of the calculated route. Where weather conditions are particularly poor, knowledge of the weather conditions serves to enhance driver safety, because the user is prepared for the weather conditions that lie ahead on the journey. Furthermore, the user is also able to take precautions to mitigate the effects of the weather conditions, for example the user can ensure that snow chains are taken on the journey or ever an umbrella, for example if the user plans to stop en-route. The method and apparatus also provide an immediate impression, based on single view, of the weather conditions along a route, thereby saving the user time and effort. Additionally, a single source of information is employed as opposed to the gathering of information from multiple different sources. The method and apparatus can also provide an immediate impression, based on a single view, of the weather conditions which have just been, or will just be, missed when travelling as planned, as well as the weather conditions which can be expected when travelling later than planned.

Other advantages of these embodiments are set out hereafter, and further details and features of each of these embodiments are defined in the accompanying dependent claims and elsewhere in the following detailed description.

BRIEF DESCRIPTION OF THE DRAWINGS

At least one embodiment of the invention will now be described, by way of example only, with reference to the accompanying drawings, in which.

DETAILED DESCRIPTION OF PREFERRED EMBODIMENTS

Figure 1:
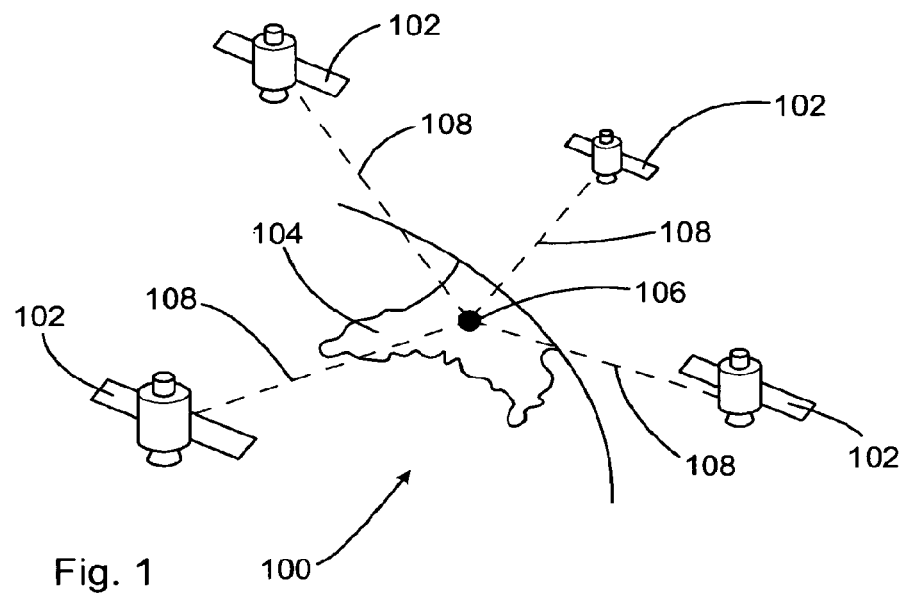
FIG. 1 is a schematic illustration of an exemplary part of a Global Positioning System (GPS) usable by a navigation apparatus.

Throughout the following description identical reference numerals will be used to identify like parts.

Example embodiments of the present disclosure may be described with particular reference to a navigation device (ND) or personal navigation device (PND). It should be remembered, however, that the teachings of the present disclosure are not limited to dedicated NDs or PNDs, but are instead universally applicable to any type of processing device that is configured to execute navigation software so as to provide route planning and navigation functionality. It follows, therefore, that in the context of the present application, a navigation device is intended to include (without limitation) any type of route planning and navigation device, irrespective of whether that device is embodied as a PND, a navigation device built into a vehicle, or a computing resource (such as a desktop or portable personal computer (PC), mobile telephone or portable digital assistant (PDA)) executing route planning and navigation software. In addition to street/road networks, example embodiments can be implemented in pedestrian navigation networks and/or any other type of transportation network, for example a metro train.

Moreover, while example embodiments described herein make use of GPS measurements (probe trace points) including latitude and longitude coordinates as location measurements, it should be understood that location measurements may be obtained from any source and are not limited to GPS. For example, in the context of an indoor environment, indoor positioning technology can be employed, for example using Wi-Fi access points. Hence, embodiments described herein can be employed by pedestrians, for example in a shopping mall, using navigation apparatus or other electronic apparatus capable of location determination using, for example, wi-fi as mentioned above and/or cellular communications technology With the above provisos in mind, a Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be, determined with only two signals using other triangulation techniques). Implementing geometric triangulation, the receiver uses the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting the earth 104. A GPS receiver 106 receives spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. As mentioned above, the GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
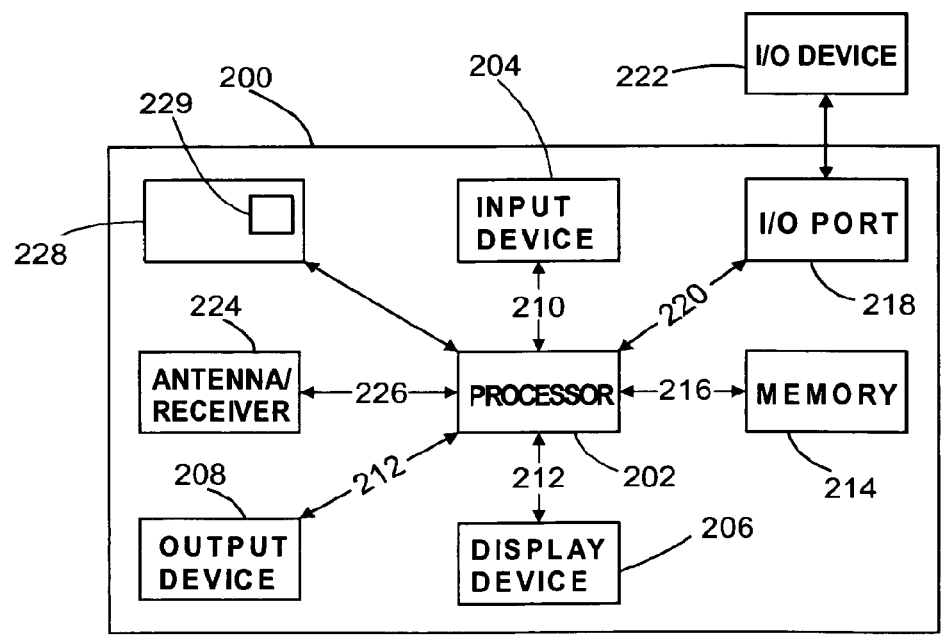
FIG. 2 is a schematic diagram of electronic components of a navigation apparatus constituting an embodiment of the invention.

Referring to FIG. 2, it should be noted that the block diagram of the navigation apparatus 200 is not inclusive of all components of the navigation apparatus, but is only representative of many example components. The navigation apparatus 200 is located within a housing (not shown). The navigation apparatus 200 includes a processing resource, for example a processor 202, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

Figure 3:
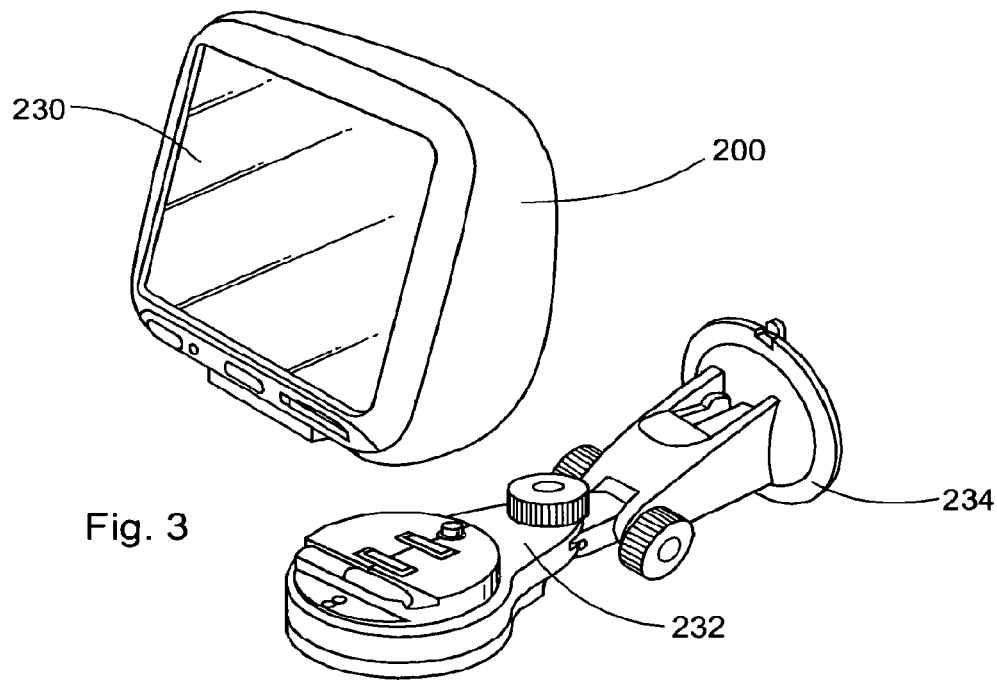
FIG. 3 is a schematic diagram of a docking arrangement for optional use in a vehicle.

In one arrangement, one aspect of the input device 204, the touch panel, and the display screen 206 are integrated so as to provide an integrated input and display device, including a touchpad or touchscreen input 230 (FIG. 3) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation apparatus 200, the processor 202 is operatively connected to and capable of receiving input information from input device 204 via a connection 210, and operatively connected to at least one of the display screen 206 and an output device 208, via respective output connections 212, to output information thereto. The output device 208 is, for example, an audible output device (e.g. including a loudspeaker). As the output device 208 can produce audible information for a user of the navigation apparatus 200, it should equally be understood that input device 204 can include a microphone and software for receiving input voice commands as well. Further, the navigation apparatus 200 can also include any additional input device 204 and/or any additional output device, such as audio input/output devices. The processor 202 is operably coupled to a memory resource 214 via connection 216 and is further adapted to receive/send information from/to input/output (I/O) ports 218 via connection 220, wherein the I/O port 218 is connectible to an I/O device 222 external to the navigation apparatus 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones. The memory resource 214 comprises, for example, a volatile memory, such as a Random Access Memory (RAM) and a non-volatile memory, for example a digital memory, such as a flash memory.

FIG. 2 further illustrates an operative connection between the processor 202 and an antenna/receiver 224 via connection 226, wherein the antenna/receiver 224 can be a GPS antenna/receiver for example. It should be understood that the antenna and receiver designated by reference numeral 224 are combined schematically for illustration, but that the antenna and receiver may be separately located components, and that the antenna can be a GPS patch antenna or helical antenna for example.

In order to support communications in a Universal Mobile Telecommunications System (UMTS), the processor 202 is also coupled to a cellular communications module 228 constituting the mobile telephone technology. The cellular communications module 228 supports a communications interface 229 for transmitting and receiving data wirelessly. The cellular communications module 228 comprises a Subscriber Identity Module (SIM) (not shown) coupled thereto having a data subscription associated therewith. The subscription is, in this example, for a limited data usage over a predetermined period of time, for example a calendar month. In other embodiments, the subscription need not have a data usage limit. The cellular communications module 228 supports a bidirectional data communications service, for example a packet switched data service, such as a General Packet Radio Service (GPRS) supported by the GSM communications network and/or a High Speed Downlink Packet Access (HSDPA) service supported by the UMTS network. The communications interface 229 is therefore compatible with the bidirectional data communications service. The bidirectional data communications service supports an Internet Protocol (IP) for data communications although use of other protocols, additionally or alternatively, is contemplated.

In this example, the navigation apparatus 200 comprises the cellular communications module 228. However, in another embodiment, a data session can be established, if required, with the communications network via a separate wireless communications terminal (not shown), such as a mobile telephone, PDA, and/or any device with mobile telephone technology, in order to establish a digital connection, for example a digital connection via known Bluetooth technology. In this respect, the navigation apparatus 200 can be Bluetooth enabled in order that the navigation apparatus 200 can be agnostic to the settings of the wireless communications terminal, thereby enabling the navigation apparatus 200 to operate correctly with the ever changing range of mobile telephone models, manufacturers, etc. Model/manufacturer specific settings can, for example, be stored by the navigation apparatus 200, if desired. The data stored for this information can be updated. It should therefore be understood that the navigation apparatus is an example of a communications-enabled mobile computing apparatus.

It will, of course, be understood by one of ordinary skill in the art that the electronic components shown in FIG. 2 are powered by one or more power sources (not shown) in a conventional manner. As will be understood by one of ordinary skill in the art, different configurations of the components shown in FIG. 2 are contemplated. For example, the components shown in FIG. 2 can be in communication with one another via wired and/or wireless connections and the like. Thus, the navigation apparatus 200 described herein can be a portable or handheld navigation apparatus.

To facilitate use thereof, the portable or handheld navigation apparatus 200 of FIG. 2 can be connected or "docked" (FIG. 3) in a known manner in an automobile, or any other suitable vehicle, for example to a bicycle, a motorbike or a boat. The navigation apparatus 200 is then removable from the docked location for portable or handheld navigation use.

The navigation apparatus 200 can sit on an arm 232, which itself can be secured to a vehicle dashboard/window/etc. using a suction cup 234. This arm 232 is one example of a docking station to which the navigation apparatus 200 can be docked. The navigation apparatus 200 can be docked or otherwise connected to the arm 232 of the docking station by snap connecting the navigation apparatus 200 to the arm 232 for example. The navigation apparatus 200 may then be rotatable on the arm 232. To release the connection between the navigation apparatus 200 and the docking station, a button (not shown) on the navigation apparatus 200 may be pressed, for example. Other equally suitable arrangements for coupling and decoupling the navigation apparatus 200 to a docking station are well known to persons of ordinary skill in the art.

Figure 4:
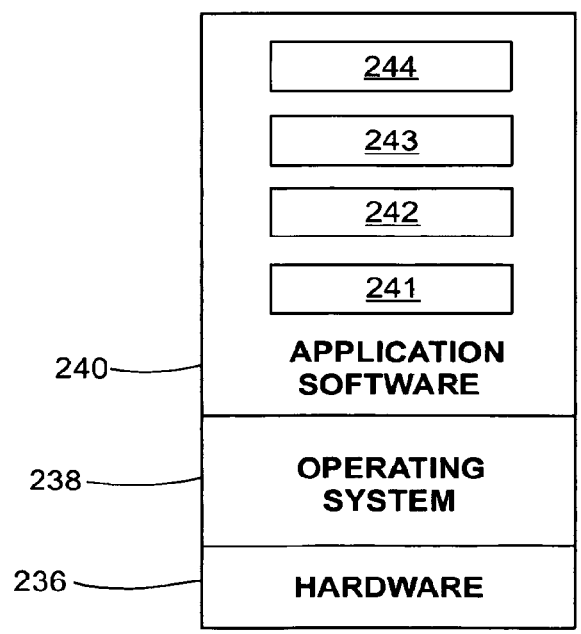
FIG. 4 is a schematic representation of an architectural stack employed by the navigation apparatus of FIG. 2.

Turning to FIG. 4, the memory resource 214 of the navigation apparatus 200 stores a boot loader program (not shown) that is executed by the processor 202 in order to load an operating system 238 from the memory resource 214 for execution by functional hardware components 236, which provides an environment in which application software 240 can run. The operating system 238 serves to control the functional hardware components 236 and resides between the application software 240 and the functional hardware components 236. The application software 240 provides an operational environment including the GUI that supports core functions of the navigation apparatus 200, for example map viewing, route planning, navigation functions and any other functions associated therewith. In this example, the application software 240 supports a route calculator 241, a time estimation module 242, a route segmentation module 243 and a weather data processing engine 244.

Figure 5:
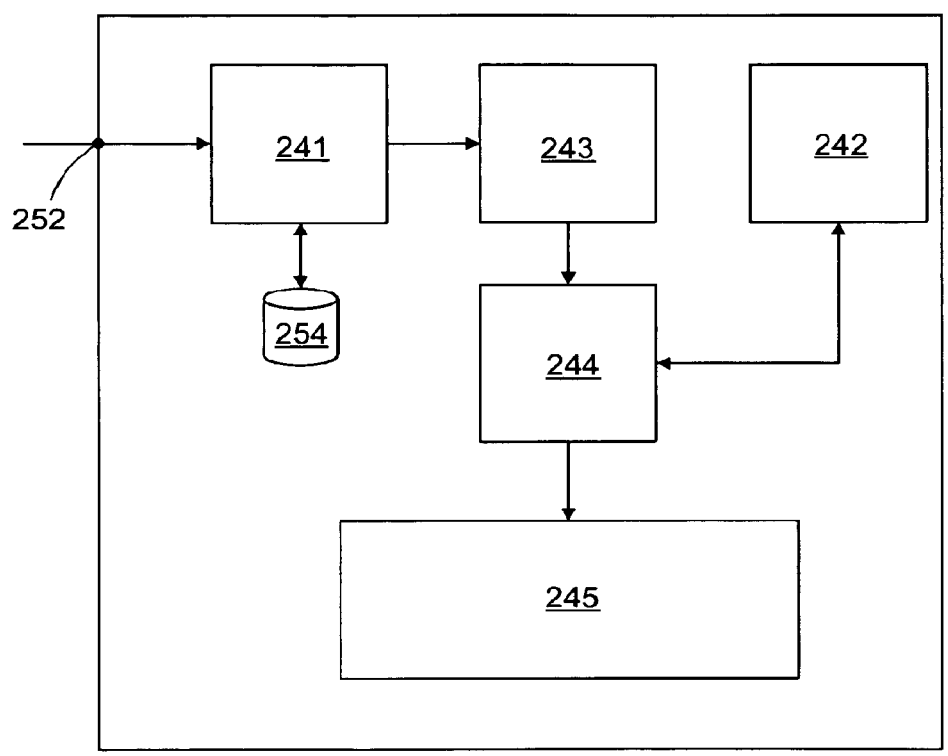
FIG. 5 is a schematic diagram of functional elements of FIG. 4 in greater detail.

Referring to FIG. 5, the route calculator 241 having an input 252 for receiving route calculation parameters from a navigation input module (not shown), for example a start location and a destination location constituting, in this example, the first and second locations mentioned above. The route calculator 241 has access to a map database 254 comprising geospatial data. The route calculator 250 is also operably coupled to the route segmentation module 243, the route segmentation module 243 being operably coupled to the weather data processing engine 244. The weather data processing engine 244 is operably coupled to the time estimation module 242 and a user interface module 245.

Figure 6:
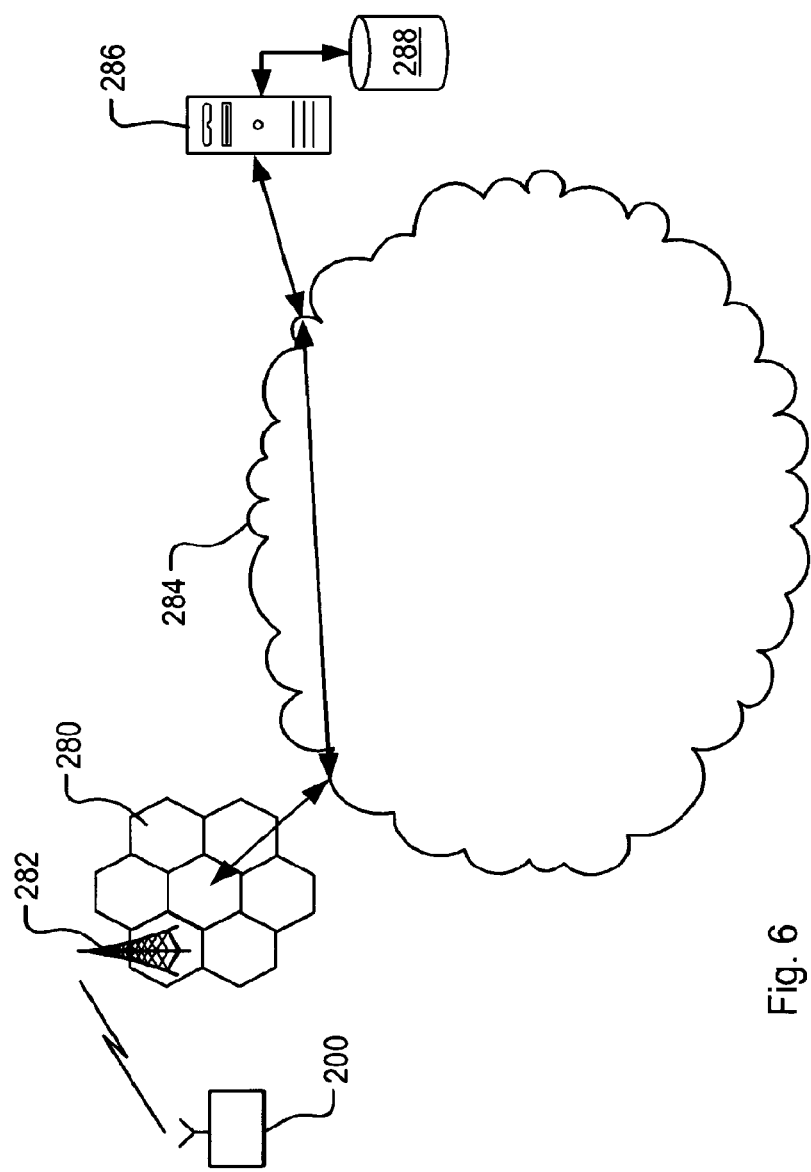
FIG. 6 is a schematic diagram of a communications network used by the apparatus of FIG. 2.

In this respect, and turning to FIG. 6, the navigation apparatus 200 is capable of communicating with a cellular communications network 280, for example the UMTS network mentioned above, via one or more Node Bs 282 thereof. Whilst reference herein is made to the UMTS network, the skilled person should appreciate that the embodiments described herein are not limited to the UMTS network and use of other wireless communications networks is contemplated.

The cellular communications network 280 is operably coupled to the Internet 284. A remote server 286 is "attached" to the Internet 284 via an Internet Service Provider (ISP) and constitutes an example of an external resource. The remote server 286 comprises or is coupled to a further database of weather data 288. The navigation apparatus 200, in combination with the remote server 286 and the functional relationship therebetween constitutes a content delivery system.

As explained above, the establishment of the network connection between the navigation apparatus 200 (via a service provider) and another device, for example the remote server 286, using the Internet 284, can be done in any suitable known manner. In this respect, any number of appropriate data communications protocols can be employed. Furthermore, the communications module 228 can utilize any number of communication standards such as CDMA2000, GSM, IEEE 802.11 a/b/c/g/n, etc.

In operation, it is assumed, for the sake of ease of illustration, that the user, a visitor to the offices of the European Patent Office in The Hague, located at Patentlaan 2, Rijswijk, requires navigation assistance to the offices of TomTom International BV located at Rembrandtplein 35, Amsterdam.

In order to implement navigation to the above destination using the navigation apparatus 200, the user configures a route for calculation as follows. Referring to FIGS. 7 to 15, the user undertakes an illustrative destination location input process described hereinbelow using a location browser function supported by the user interface. Although not shown, the user uses a settings menu option supported by the application software 240 in order to select view generation in a three-dimensional mode.

Figure 7:
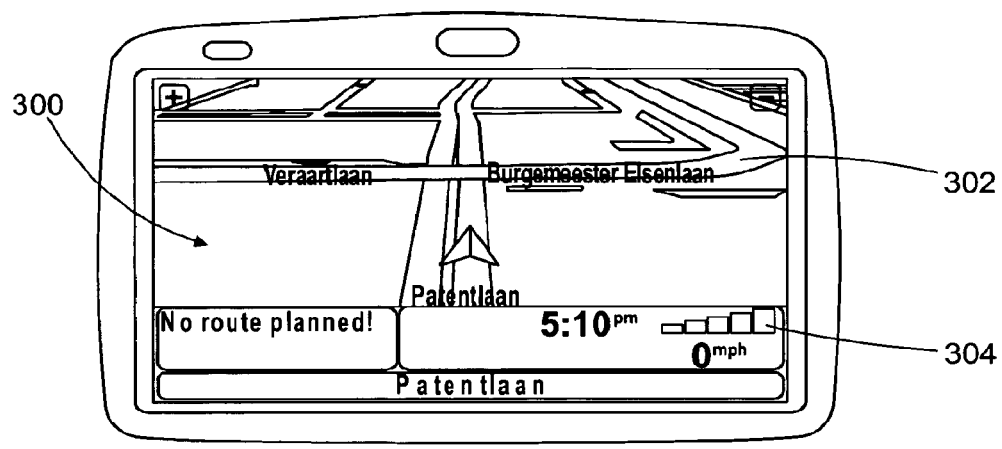
FIGS. 7 to 15 are screen shots of the navigation apparatus in relation to selection of a route associated with a proposed journey.

When the user powers-up the navigation apparatus 200, the GPS module 658 of the apparatus 200 acquires GPS data and performs a self-location determination by calculating (in a known manner) the current location of the navigation apparatus 200. The user is then presented, as shown in FIG. 7, with a display 300 showing in pseudo three-dimensions: a local environment 302 in which the navigation apparatus 200 is determined to be located and, in a region 304 of the display 300 below the local environment 302, a set of control and status messages.

Figure 8:
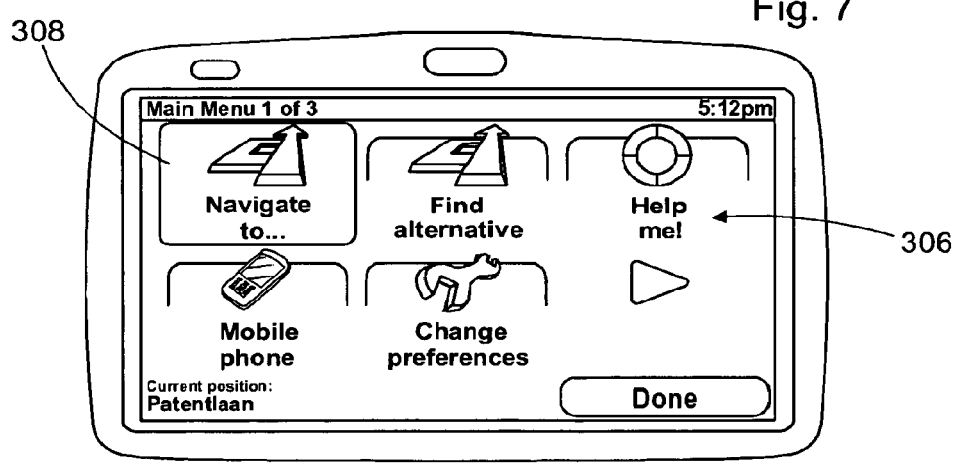

By touching the display at the local environment 302, the navigation apparatus 200, through the user interface, updates the display 300 by displaying (as shown in FIG. 8) a series of virtual or soft buttons 306 by means of which the user can, inter alia, input a destination to which the user wishes to navigate.

Figure 9:
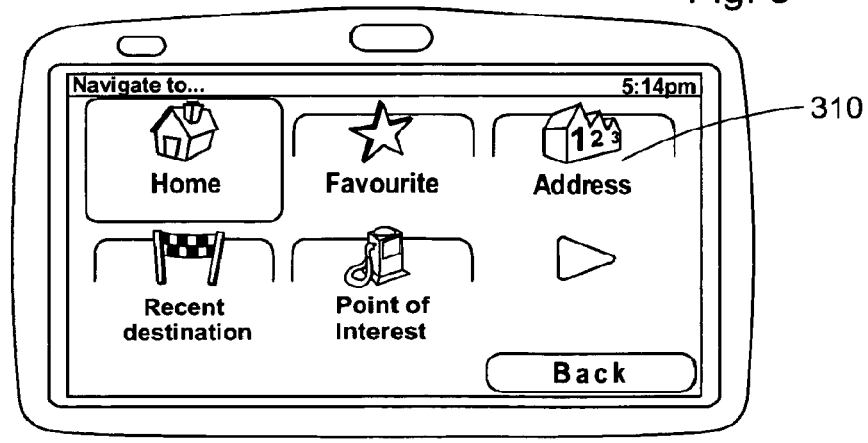

By touching the "Navigate to" virtual button 308, the navigation apparatus 200 initiates a route calculation procedure, a part of which comprises a route creation procedure. In accordance with the route creation procedure, the navigation apparatus 200 displays (as shown in FIG. 9) a plurality of virtual buttons that are each associated with a different category of selectable destinations. In this instance, the display shows a "home" button that if pressed would set the destination to a stored home location. The "favourite" button, if pressed, reveals a list of destinations that the user has previously stored in the navigation apparatus 200 and if one of these destinations is then selected the destination for the route to be calculated is set to the selected previously stored destination. The "Recent destination" soft button, if pressed, reveals a list of selectable destinations held in the memory of the navigation apparatus 200 and to which the user has recently navigated. Selection of one of the destinations populating this list would set the destination location for this route to the selected (previously visited) location. The "point of interest" button, if pressed, reveals a number of options by means of which a user can opt to navigate to any of a plurality of locations, such as Automatic Teller Machines (ATMs), petrol stations or tourist attractions for example, that have been pre-stored in the navigation apparatus 200 as locations to which a user of the navigation apparatus 200 might want to navigate to. A triangular arrow-like virtual button provides access to additional sub-menu options relating to the "Navigate to . . . " menu option, and an "address" button 310 commences a process by which the user can input the street address of the destination to which the user wishes to navigate.

Figure 10:
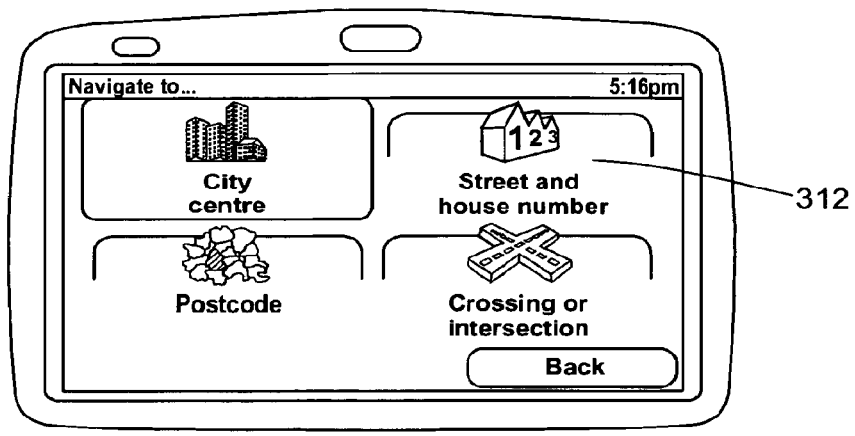

Since the user, in this example, knows the street address of the destination to which the user wishes the navigation apparatus 200 to navigate, it is assumed that the "address" button 310 is operated (by touching the virtual button displayed on the touchscreen) in order to select a location as the destination, whereupon (as shown in FIG. 10) the user is presented with a series of address input options: address input by "city centre", by "postcode", by "crossing or intersection" (for example a junction of two roads) and by "street and house number".

Figure 11:
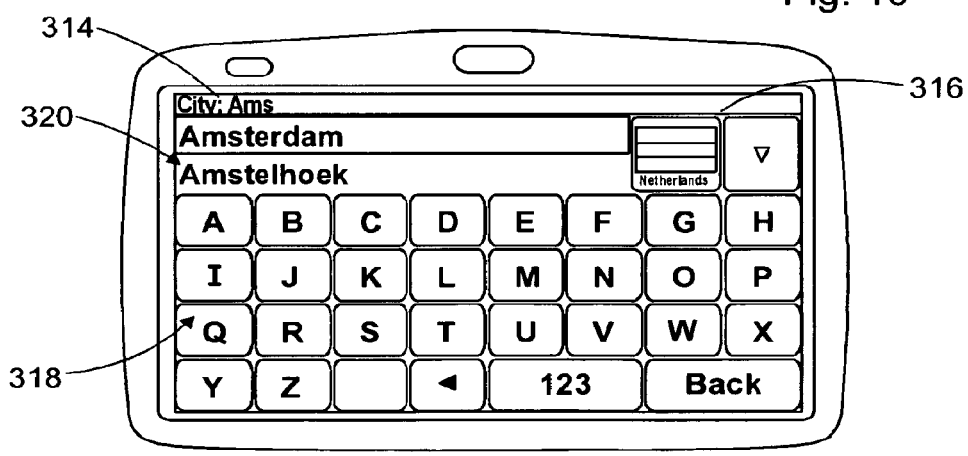

In this example, the user knows the street address and house number of the destination and hence selects a "street and house number" virtual button 312 whereupon the user is then presented, as shown in FIG. 11, with: a prompt 314 to enter the name of the city to which they wish to navigate, a flag button 316 by means of which the user can select the country in which the desired city is located, and a virtual keyboard 318 that may be operated by the user, if necessary, to input the name of the destination city. In this instance the user begins to type the word "Amsterdam" and the navigation apparatus 200 therefore responds by providing the user with a list 320 of selectable cites.

Figure 12:
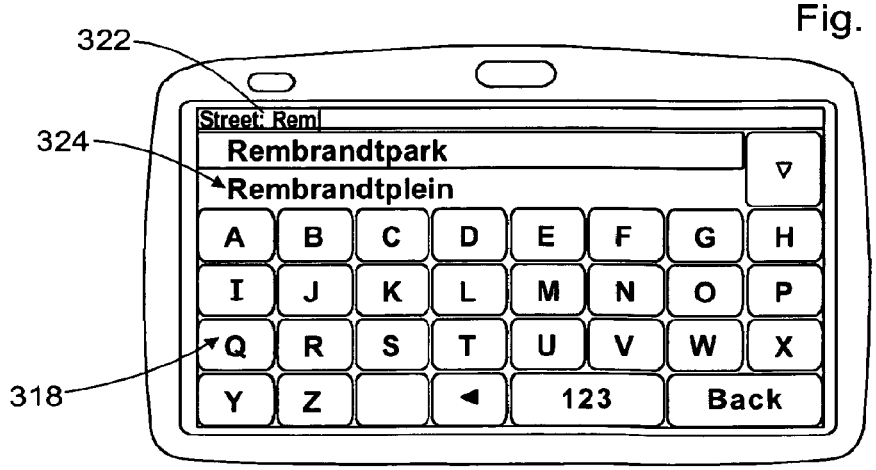
Figure 13:
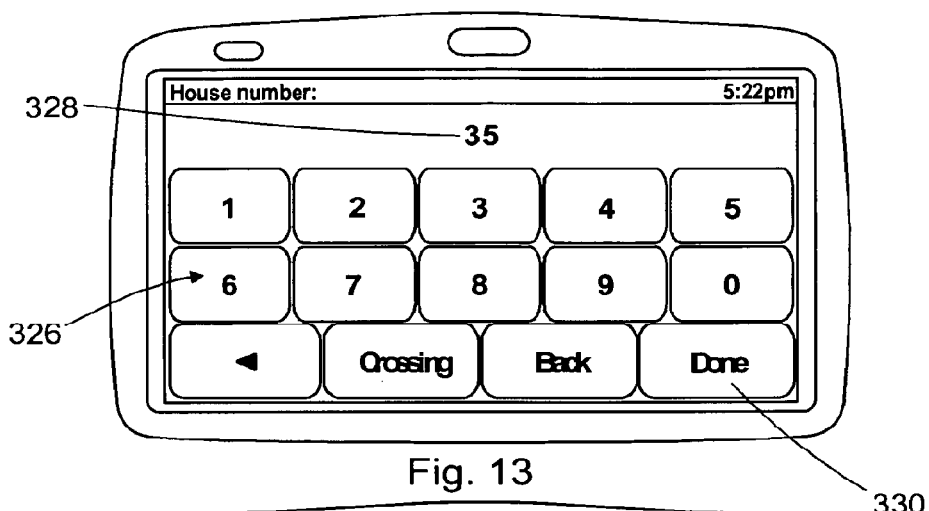
Figure 14:
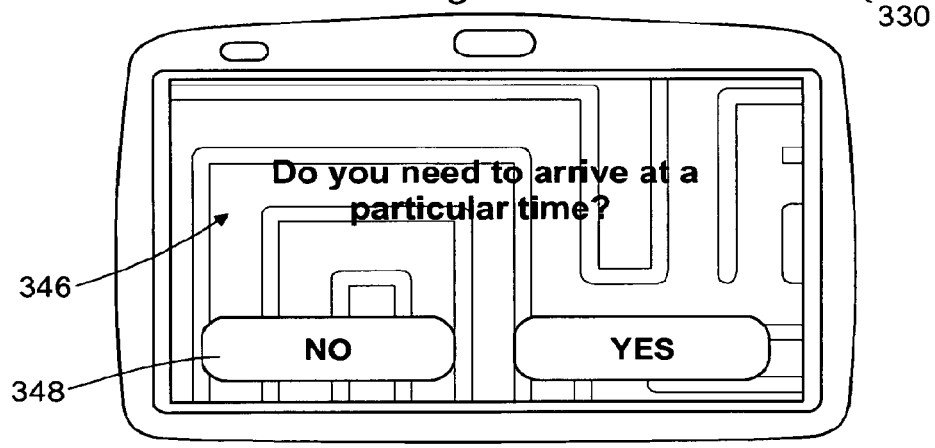

The user in this instance wishes to navigate to Amsterdam, and on selection of Amsterdam from the list 320 the navigation apparatus 200 displays, as shown in FIG. 12, a prompt 322 for entry of a street name as well as the virtual keyboard 318 again by means of which the user can input street names. In this instance, the user begins to type the name of the street in which the destination is located and the navigation apparatus 200 responds by providing the user with a list 324 of selectable street names.

In this example, the user wishes to travel to the street "Rembrandtplein" and so the user selects "Rembrandtplein" from the displayed list 324.

Once a street has been selected, the navigation apparatus 200 then displays (FIG. 13) a restricted, largely numeric, virtual keypad 326 and prompts the user, by means of prompt 328, to enter the street number in the selected street and city to which the user wishes to navigate. If the user has previously navigated to a building number in this street, then that number is initially shown. If, as in this instance, the user wishes to navigate to No. 35, Rembrandtplein, then the user simply needs to type the street number ("35") using the virtual keypad 326 and then touch a "done" virtual button 330 displayed at the bottom right hand corner of the display 300. If the user should wish to navigate to a different building number in Rembrandtplein, then all the user needs do is operate the virtual keypad 326 to input an appropriate building or street number.

In the event that the user decides that navigation to the building number suggested is required, the user touches the "Done" virtual button 330. The application software 240 then causes the user interface to present an interrogation message 346 (FIG. 14) asking the user whether a particular arrival time is required. If the user should touch a "yes" virtual button, then functionality is invoked that estimates the time required to travel to the destination (after provision by the user of the desired arrival time) and advises the user when they should leave (or if they are running late, should have left) their current location in order to arrive at their destination on time. In this instance, the user is not concerned about arriving at a particular time and hence selects a "no" virtual button 348.

Figure 15:
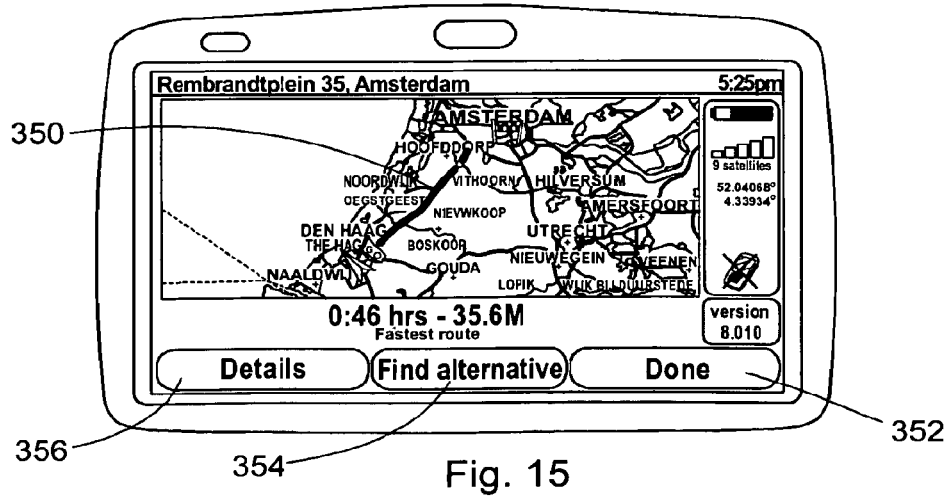

Selecting the "no" virtual button 348 causes the route calculator 250 of the navigation module 242 to calculate, using the geospatial data stored in the map database 254, a route between the current location and the selected destination, and to display a route 350 calculated, as shown in FIG. 15, on a relatively low magnification map that shows the entire route.

Figure 16:
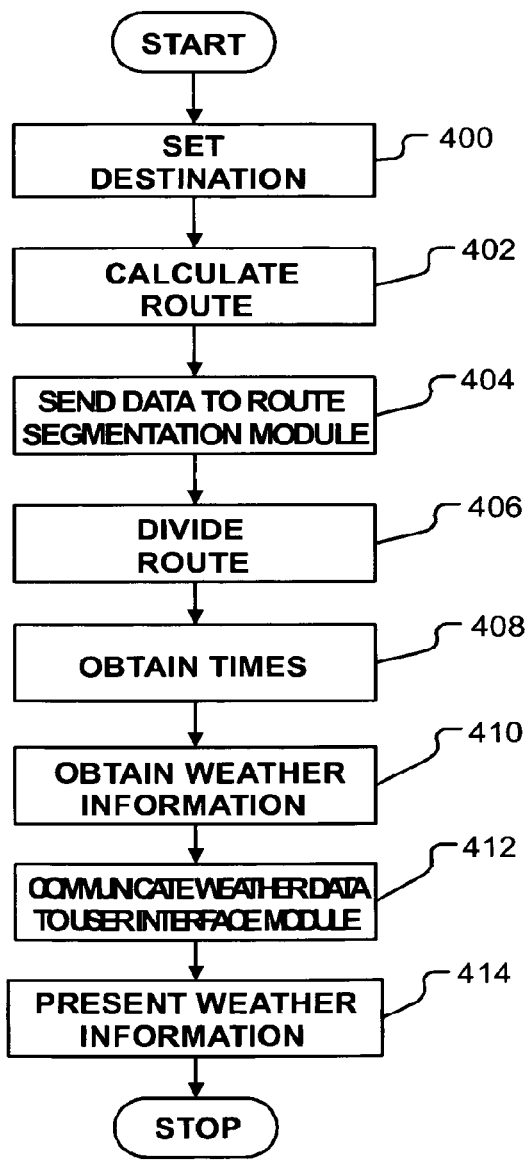
FIG. 16 is a flow diagram of a method of providing weather condition information constituting another embodiment of the invention.

Referring to FIG. 16, after the user has set the destination (Step 400) and the route has been calculated (Step 402) as described above, the route data is communicated (Step 404) by the route calculator 241 to the route segmentation module 243. The route segmentation module 243 divides (Step 406) the route calculated into route parts, for example segments, and communicates location information relating to the route parts or segments to the weather data processor engine 244. In this example, the location information communicated is a mid-point along a route part that constitutes the middle of the route segment. The weather data processor engine 244 then interrogates (Step 408) the time estimation module 243, providing the mid-point information for each of the route parts to the time estimation module 243 and obtains estimated times associated with each route part, based upon a start time provided by the user.

The weather data processor engine 244 then accesses the weather data 288 stored by the remote server 286 and obtains (Step 410) weather information in respect of a geographic region corresponding to each route part and the time at which the user is estimated respectively to be travelling along the route part, i.e. present in the route part.

The weather data processor engine 244 then communicates (Step 412) the weather data obtained for each route part to the user interface 245 for communication to the user. In this respect, the weather information can be communicated (Step 414) graphically in combination with map data showing the route calculated. Alternatively or additionally, the weather data can be communicated to the user as a list identifying route parts and associated weather conditions at the time the user is estimated to be present in each route part.

Figure 17:
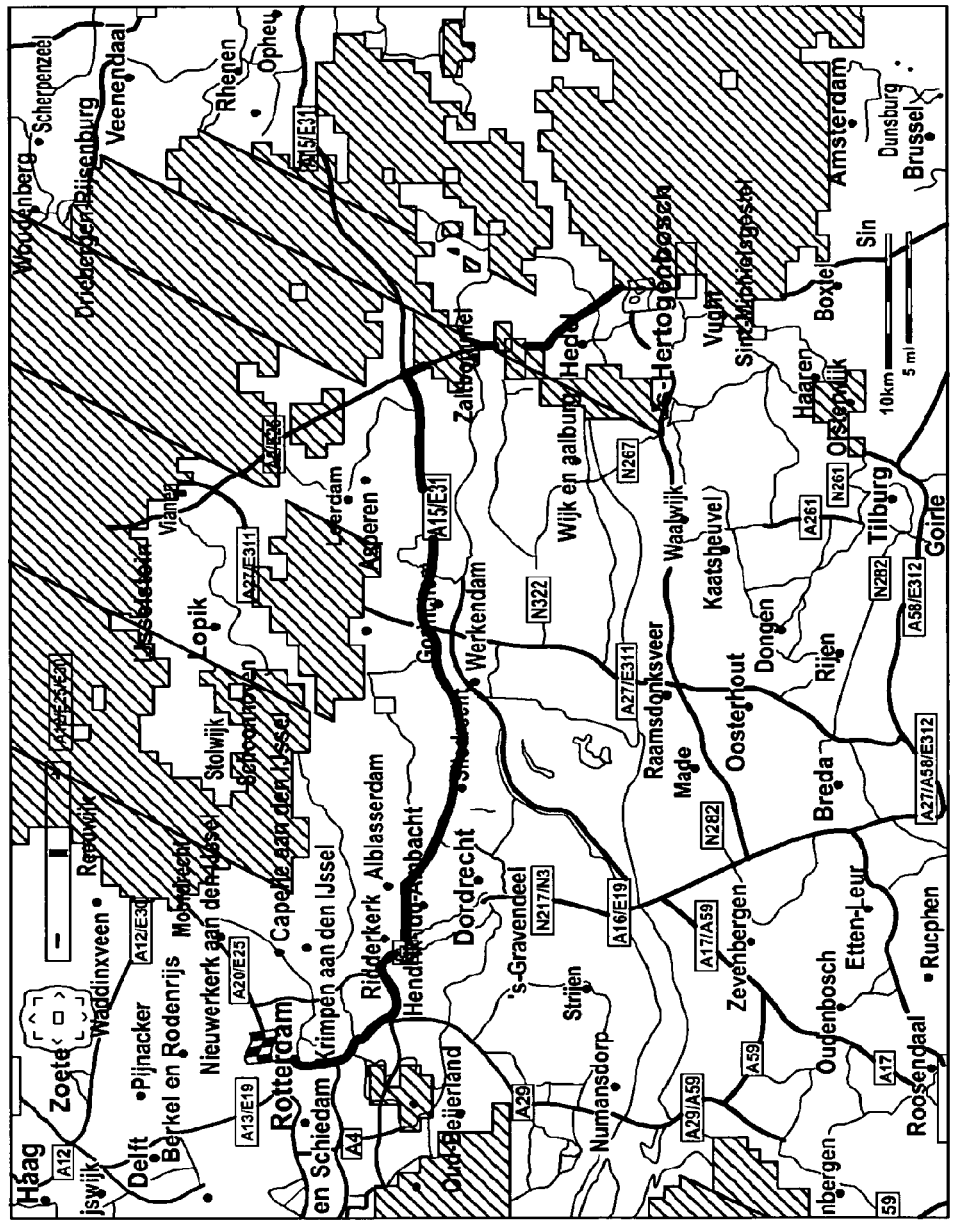
FIG. 17 is a schematic diagram of presentation of weather information using the method of FIG. 16.

Referring to FIG. 17, in relation to the first implementation, the route summary can be divided into "slices" that conform to the division of the calculated route and then the weather data obtained corresponds to the "slices" defined for the respective times at which the user will attend the route part for the slice. are as described weather data can be displayed as segments. Hence, a slice or weather is shown as it is predicted for the part of the route and at the associated time.

As can be seen from FIG. 17, the presentation of the weather conditions outside the route (e.g. on a map) is optimized to show weather conditions that have been or will be missed when travelling at the time used for the route planning and what is to be expected when leaving later.

The number of segments in which to divide the calculated route can be based upon the length of route calculated and/or an estimated travel time for each segment. Consequently, each segment cay be of equal length. Alternatively, route segments can correspond to the same time period, namely the estimated time to travel each route segment would be the same.

The slicing of the map for superimposition of weather data can be achieved in a number of ways, for example the slicing can be in the shape of radius or radii from an origin point, for example a start location. Alternatively, the slicing can be implemented by using the shape of a radius or radii from multiple locations along the calculated route. Another technique employs the use of parallel bars of map area, the bars being perpendicular to the calculated route or parallel to a direction in which a given weather pattern is heading so that weather conditions just missed and still to be expect can be seen. The slicing can be in bands having a radius or curve such that it is optimized to show the direction the weather is heading. In a further example, the slicing of the map can be in bands perpendicular to any curve representing a weather front.

In relation to the weather data, for example rain radar data, corresponding "slices" of the weather data are taken so as to match the time and location of the weather conditions to the time and location of the user along the route. In another embodiment, the time intervals of the weather data (e.g. 5 minutes) are arranged matches the distance bridged in this time interval by the user along the route.

Figure 18:
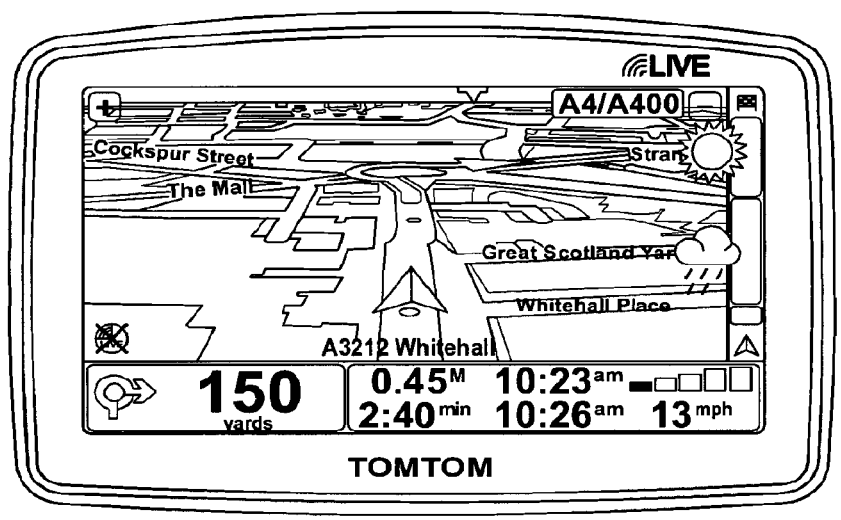
FIG. 18 as a screen shot of presentation of weather information in a different manner to that of FIG. 17, but using the method of FIG. 16.

In another embodiment, the weather according to progress along the calculated route can be shown as a side progress bar (FIG. 18). In this regard, the weather conditions are shown as portions of the side bar and the progress of the user through the weather conditions, depending upon location along the calculated route is shown by an icon depicting the user's progress.

In another embodiment, the user may not be content with the weather conditions to be encountered along the route calculated. In this respect, the user interface can allow the user an opportunity to re-calculate the route by changing a start time. Alternatively, the user can be permitted to specify the weather conditions preferred en-route and so the route calculator 241 can cooperate with the weather data processor engine 244 in order calculate a route that obviates or minimises certain specified undesirable weather conditions.

It should also be appreciated that weather data may be obtained from an independent source of weather data and recalculation of the weather data presented may be necessary as a result of the weather data being provided in respect of predefined time intervals, for example 30 minute periods of time, but the independent source of weather data. In this respect, a user following the calculated route may be delayed in which case the time of arrival of the user in a subsequent route part may be at a time that is outside the time interval for the weather data previously retrieved. In this respect, a time threshold can be set to, for example, a value between 15 and 30 minutes and if the user arrives at a subsequent route part at a time in excess of the time period of the weather data already provided and in excess by the time threshold defined, the weather data processor engine 244 recalculates the weather data in respect of the subsequent route part. In another example, the weather data can be recalculated in respect of all subsequent route parts.

Once the user has approved the route calculated, the user is also provided with a "done" virtual button 352 (FIG. 15), which the user can press to indicate the calculated route is acceptable, a "find alternative" virtual button 354 that the user can press to cause the navigation apparatus 200 to calculate another route to the selected destination, and a "details" virtual button 356 that a user can press to reveal selectable options for the display of more detailed information concerning the currently displayed route 350.

In this instance, it is assumed that the user considers the displayed route acceptable, and once the "done" button 352 has been pressed the user is presented, with a three-dimensional view (not shown) of the current, start, location for the navigation apparatus 200. The user then commences their journey and the navigation apparatus 200 guides the user in the following manner.

The skilled person should appreciate that other embodiments are also conceivable. For example, the navigation apparatus can be arranged to provide alerts based upon the weather data obtained, for example an advice when improved weather conditions are likely to be encountered.

In another embodiment, the navigation apparatus can be arranged to show weather conditions and progression along the calculated route in an animated manner. The progression of the weather conditions can therefore be combined with an indicator of the location along the calculated route.

In a further embodiment, the weather data can be supplemented with or replaced by other types of data, for example ambient light level data, such as data indicative of the existence of sunlight or moonlight. This can allow users to be informed as to whether they will be driving, for example in the rain and in the dark.

Whilst embodiments described in the foregoing detailed description refer to GPS, it should be noted that the navigation apparatus may utilise any kind of position sensing technology as an alternative to (or indeed in addition to) the GPS. For example the navigation apparatus may utilise other global navigation satellite systems (GNSS) such as the proposed European Galileo system when available. Equally, it is not limited to satellite based but could readily function using ground based beacons or any other kind of system that enables the device to determine its geographic location, for example the long range navigation (LORAN)-C system.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A navigation apparatus comprising:
a processing resource arranged to support, when in use, an operational environment, the operational environment supporting a route calculator, a time estimation module, a route segmentation module, a weather data processing engine and a user interface module;
a map database comprising geospatial data;
the route calculator arranged to calculate, when in use, a route between a first location and a second location at a particular journey start time;
the time estimation module arranged to estimate a time at which a user will be present at a location along the route;
the route segmentation module arranged to divide the route into a plurality of route parts and to obtain from the time estimation module at least one time of presence associated with at least one of the plurality of route parts;
the weather data processing engine arranged to provide weather data associated with a route part of the plurality of route parts in respect of the time of presence associated with the route part; and
the user interface module arranged to communicate to the user the weather data in respect of a number of the plurality of route parts and at respective times of presence associated with the number of the plurality of route parts, the weather data being communicated graphically in combination with a map which is divided into slices conforming to the route parts to show, per each slice, weather conditions outside the route that have been or will be missed at the respective times of presence associated with the respective route part, and wherein the user interface module is further arranged to receive an instruction to re-calculate the route after communicating the weather data by changing the journey start time, and wherein the route calculator is arranged to re-calculate the route in response to the instruction to re-calculate the route.

2. An apparatus as claimed in claim 1, wherein the user interface module is arranged to communicate, to the user, weather data for one or more route parts of the re-calculated route.

3. An apparatus as claimed in claim 1, wherein the weather data processing engine is arranged to obtain the weather data from a source of weather data remote from the navigation apparatus.

4. An apparatus as claimed in claim 1, wherein the route calculator is arranged to receive weather preference data provided by the user and to cooperate with the weather data processing engine in order to calculate the route so as to attempt to satisfy a weather preference represented by the weather preference data.

5. An apparatus as claimed in claim 1, wherein dividing the route comprises determining a plurality of points along the route and dividing the route based on radii from each of the plurality of points.

6. An apparatus as claimed in claim 1, wherein dividing the route comprises dividing the route based on a directional heading of a particular weather pattern.

7. An apparatus as claimed in claim 1, wherein dividing the route comprises dividing the route into equally-sized temporal lengths based on estimated transit times.

8. An apparatus as claimed in claim 1, wherein communicating the weather data graphically comprises displaying a pattern of the weather overlaid on the map.

9. An apparatus as claimed in claim 1, wherein showing weather conditions outside the route that have been or will be missed at the respective times of presence associated with the number of the plurality of route parts comprises displaying the weather conditions overlaid on portions of the map remote from route parts.

10. An apparatus as claimed in claim 1, wherein communicating the weather data graphically as a semitransparent weather pattern overlay on a map to show weather conditions outside the route that have been or will be missed at the respective times of presence associated with the number of the plurality of route parts comprises:

communicating the weather data in a corresponding separate segment of the weather data overlaid on the map that includes weather data for a different respective time of presence for each route part of the number of the plurality of route parts.

11. A method of providing weather condition information on a navigation apparatus, the method comprising:

calculating a route between a first location and a second location at a particular journey start time;

dividing the route into a plurality of route parts;

estimating a time at which a user will be present at a location along the route associated with at least one of the plurality of route parts;

providing weather data associated with a route part of the plurality of route parts in respect of the time of presence associated with the route part;

communicating to the user the weather data in respect of a number of the plurality of route parts and at respective times of presence associated with the number of the plurality of route parts, the weather data being communicated graphically in combination with a map which is divided into slices conforming to the route parts to show, per each slice, weather conditions outside the route that have been or will be missed at the respective times of presence associated with the respective route part; and receiving an instruction to re-calculate the route after communicating the weather data by changing the journey start time, further comprising re-calculating the route in response to the instruction to re-calculate the route.

12. A method as claimed in claim 11, further comprising:
communicating, to the user, weather data for one or more route parts of the re-calculated route.

13. A method as claimed in claim 11, further comprising:
obtaining the weather data from a source of weather data remote from the navigation apparatus.

14. A method as claimed in claim 11, further comprising:
receiving weather preference data provided by the user; and
calculating the route so as to attempt to satisfy a weather preference represented by the weather preference data.

15. A method as claimed in claim 11, wherein dividing the route comprises determining a plurality of points along the route and dividing the route based on radii from each of the plurality of points.

16. A method as claimed in claim 11, wherein dividing the route comprises dividing the route based on a directional heading of a particular weather pattern.

17. A method as claimed in claim 11, wherein dividing the route comprises dividing the route into equally-sized temporal lengths based on estimated transit times.

18. A non-transitory computer readable storage medium storing instructions that, when executed by a processor in a navigation device, cause the processor to perform a method of providing weather condition information, the method comprising:

calculating a route between a first location and a second location at a particular journey start time;

dividing the route into a plurality of route parts;

estimating a time at which a user will be present at a location along the route associated with at least one of the plurality of route parts;

providing weather data associated with a route part of the plurality of route parts in respect of the time of presence associated with the route part;

communicating to the user the weather data in respect of a number of the plurality of route parts and at respective times of presence associated with the number of the plurality of route parts, the weather data being communicated graphically in combination with a map which is divided into slices conforming to the route parts to show, per each slice, weather conditions outside the route that have been or will be missed at the respective times of presence associated with the respective route part; and receiving an instruction to re-calculate the route after communicating the weather data by changing the journey start time, further comprising re-calculating the route in response to the instruction to re-calculate the route.

19. A non-transitory computer readable storage medium as in claim 18, wherein the method further comprises:
communicating, to the user, weather data for one or more route parts of the re-calculated route.

20. A non-transitory computer readable storage medium as in claim 18, wherein the method further comprises:
obtaining the weather data from a source of weather data remote from the navigation apparatus.

21. A non-transitory computer readable storage medium as in claim 18, wherein the method further comprises:
receiving weather preference data provided by the user; and
calculating the route so as to attempt to satisfy a weather preference represented by the weather preference data.

22. A non-transitory computer readable storage medium as in claim 18, wherein dividing the route comprises determining a plurality of points along the route and dividing the route based on radii from each of the plurality of points.

23. A non-transitory computer readable storage medium as in claim 18, wherein dividing the route comprises dividing the route based on a directional heading of a particular weather pattern.

* * * * *